Dec. 24, 1963 K. E. EWING 3,115,205
STEERING DRIVE AXLE AND MOUNTING THEREFOR
Filed May 24, 1961 2 Sheets-Sheet 1

Keith E. Ewing
INVENTOR.

Dec. 24, 1963 K. E. EWING 3,115,205
STEERING DRIVE AXLE AND MOUNTING THEREFOR
Filed May 24, 1961 2 Sheets-Sheet 2

Keith E. Ewing
INVENTOR.

United States Patent Office 3,115,205
Patented Dec. 24, 1963

3,115,205
STEERING DRIVE AXLE AND MOUNTING THEREFOR
Keith E. Ewing, Mesa, Ariz., assignor to Mutual Manufacturing Co., Inc., Mesa, Ariz., a corporation of Arizona
Filed May 24, 1961, Ser. No. 112,359
3 Claims. (Cl. 180—49)

This invention relates to a front wheel steering suspension for vehicles and more particularly to a four wheel drive vehicle having a novel front wheel steering axis support arrangement.

A primary object of the present invention is to provide a four wheel drive support arrangement for vehicles which are designed to travel over extremely rough terrain.

Another object of this invention is to provide a front wheel steering suspension for vehicles having a front wheel axle driven and supported by a differential which is supported for turning movement about a vertical steering axis spaced from the front wheel axle. The arrangement is such that protection is afforded for a universal joint connection between the vehicle propeller shaft and the drive shaft for the front wheel differential and also limited angular displacement of the front wheel differential about a horizontal axis is accommodated in order to provide the flexibility necessary for the rough terrain over which the vehicle is propelled.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
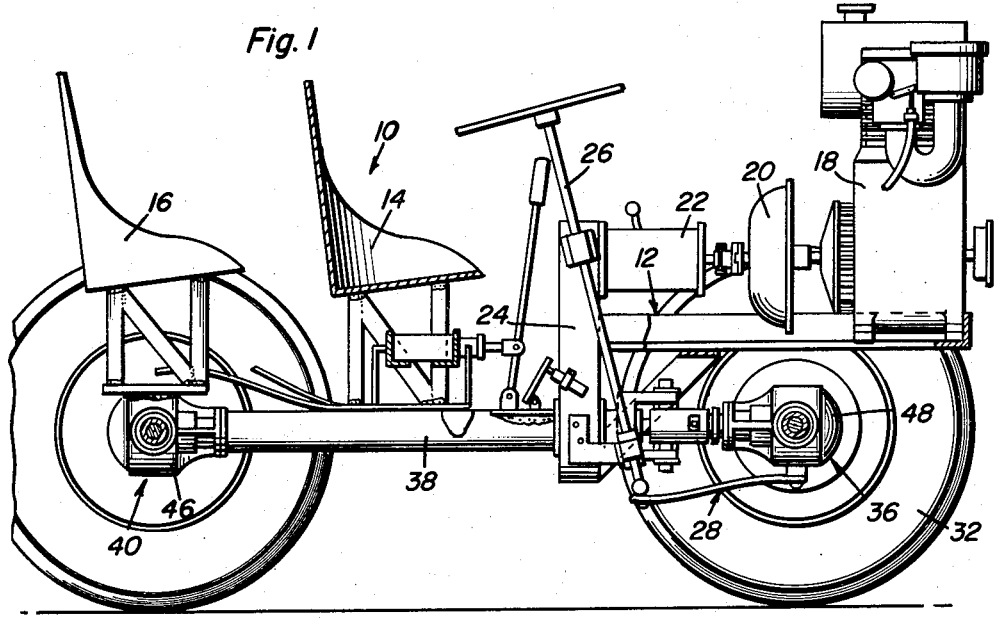
FIGURE 1 is a partial side elevational sectional view of a vehicle incorporating the novel front wheel steering suspension arrangement of the present invention.
Figure 2:
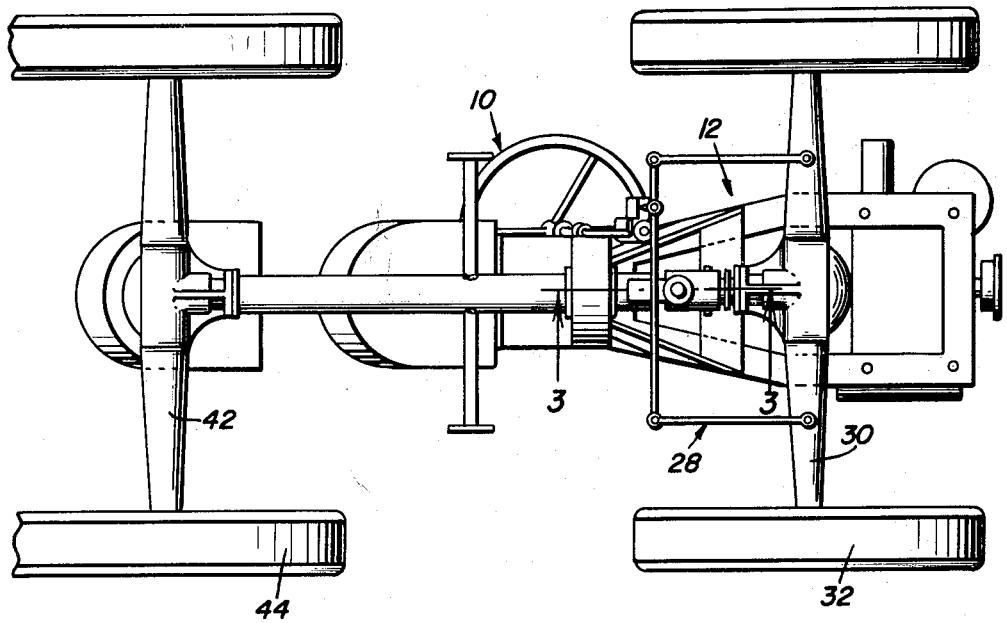
FIGURE 2 is a bottom plan view of the vehicle illustrated in FIGURE 1.

Referring now to the drawings in detail, it will be observed from FIGURES 1 and 2, that the vehicle generally referred to by reference numeral 10 is shown in skeleton form which includes a frame generally referred to by reference numeral 12 mounting a pair of seats 14 and 16. The power plant 18 for the vehicle is mounted forwardly thereof and is connected through a clutch mechanism 20 and transmission 22 to the gearing located within a gear transfer case 24. The vehicle is furnished with the usual controls including among other things, the steering control 26. The steering control 26 is therefore operatively connected through a steering linkage generally referred to by reference numeral 28 to the front wheel axle tube 30 by means of which the front wheels 32 are mounted in the usual manner. Drive for the front wheels is transmitted from the propeller shaft 34 which extends from both ends of the lower portion of the gear transfer case 24. Accordingly, a front differential drive mechanism generally referred to by reference numeral 36 is drivingly connected to one end of the propeller shaft 34 in order to impart drive to the front axle for the front wheels 32. The propeller shaft 34 also extends rearwardly from the gear transfer case 24 through a frame mounted tube 38 to the rear differential mechanism 40 which supports the rear axle tubes 42 by means of which a rear axle is connected to the rear wheels 44 by means of the driving connection afforded between the rear axle and the propeller shaft 34. It will be observed that the rear differential mechanism 40 includes a rear differential housing 46 rigidly connected to the frame by being connected to the tube 38, the rear axle tube 42 being connected laterally to the differential housing 46. The front differential mechanism 36 on the other hand is not rigidly mounted with respect to the vehicle frame 12 as is the rear differential 40 although the front differential mechanism also includes a front differential housing 48 containing a front differential drive between an input drive shaft to the differential mechanism 36 and the front wheel axles mounted within the front wheel axle tubes 30.

Figure 3:
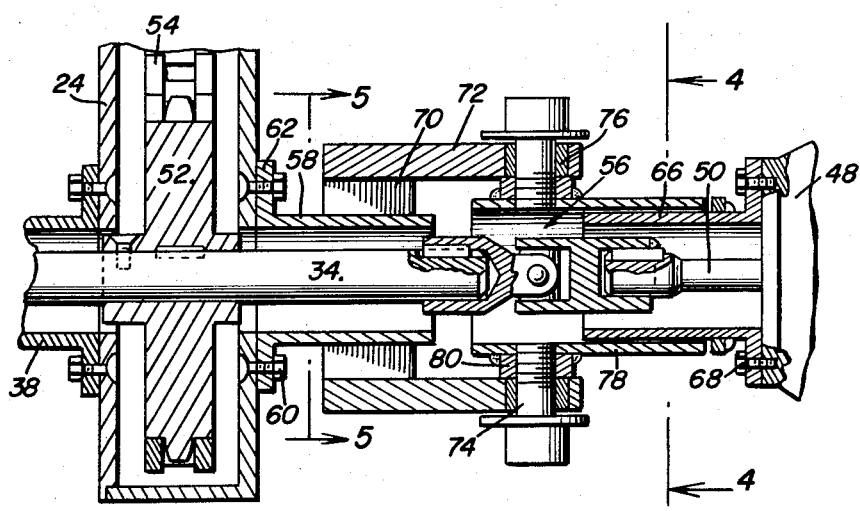
FIGURE 3 is a partial sectional view taken substantially through a plane indicated by section line 3—3 of FIGURE 2.

Referring therefore to FIGURE 3 in particular, it will be observed that the gear transfer case 24 has mounted at the lower end thereof an output gear element or sprocket gear 52 which is drivingly connected to the output of the transmission 22 in any suitable manner such as by the sprocket chain 54. The output gear element 52 is therefore splined or otherwise suitably connected to the propeller shaft 34 for imparting drive to the front and rear wheels. The propeller shaft 34 extends forwardly from the gear transfer case 24 and is splined to a universal joint connection 56 which in turn is splined to the projecting end of the drive shaft 50 for the front differential mechanism 36. Accordingly, a drive connection between the propeller shaft 34 and the front wheel axles is provided which will accommodate movement of the front wheel axle in both a vertical and horizontal direction with respect to the fixed axis about which the propeller shaft 34 rotates. It will however be apparent that a supporting suspension is required for the front wheel assembly including the front wheel axle tubes 30 connected to the differential mechanism housing 48. The supporting suspension must therefore accommodate the steering movement of the front wheel assembly. In addition thereto, the steering support suspension will accommodate limited angular displacement of the front wheel assembly about a horizontal axis which is necessary for the rough terrain over which the vehicle is designed to move.

Figure 4:
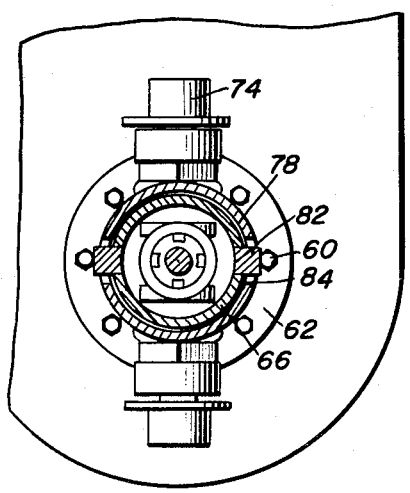
FIGURE 4 is a sectional view taken through a plane indicated by section line 4—4 in FIGURE 3.
Figure 5:
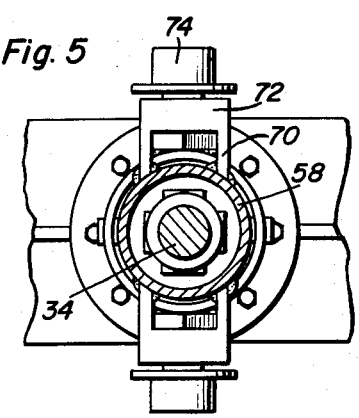
FIGURE 5 is a partial sectional view taken through a plane indicated by section line 5—5 of FIGURE 3.

The front assembly steering suspension therefore involves the rigid mounting of a tubular adapter member 58 on the forward side of the gear transfer case 24 coaxial with the projecting forward end of the propeller shaft 34. Suitable fastener bolts 60 are therefore provided for rigidly mounting the adapter member 58 by means of a flange portion 62 thereof. A similar tubular adapter member 66 is rigidly mounted on the front differential housing 48 by a plurality of fasteners 68. The rearwardly projecting end of the drive shaft 50 therefore extends into the tubular member 66. The universal joint connection 56 is disposed between the adjacent spaced ends of the tubular members 58 and 66. Rigidly mounted on the tubular member 58 as by plate members 70, are pivot supporting arms 72 through which aligned steering axis bolt assemblies 74 extend. The steering axis bolt assemblies are therefore pivotally mounted by the arms 72 about a vertical steering axis, liner bushing elements 76 being disposed in the arms 72 to accommodate pivotal movement of the bolt assemblies 74. The bolt assemblies are therefore rigidly mounted on a tubular member 78 from which the bolt assemblies extend in a radial direction. The tubular member 78 is spaced from the arms by spacer members 80 rigidly connected to the tubular member 78 as by welding in order to maintain a coaxial relationship between the tubular member 78 and the tubular members 58 and 66 which in turn are coaxial with the axially aligned propeller shaft 34 and drive shaft 50. The tubular member 78 is in turn operatively connected to the tubular member 66 on the differential housing 48 by a lost motion connection. Referring therefore to FIGURE 4 in particular it will be observed that a pair of stabilizer projections 82 are received within slots 84 in the tubular member 78 so as to accommodate limited angular motion between the tubular members 66 and 78.

From the foregoing description, operation and utility of the steering suspension for the front wheel drive of the present invention will be apparent. It will therefore be observed, that the gear transfer case 24 supports the vertical steering axis bolt assembly 74 with respect to which steering movement is imparted by the steering control 26 and linkage 28 to the front wheel assembly including the front differential housing 48. Turning movement of the bolt assemblies 74 connected by the tubular members 78 to the differential housing 48 through the tubular adapter member 66 will therefore be accommodated. Also, the aforementioned limited angular movement of the front wheel assembly about a horizontal axis will be accommodated by virtue of the lost motion connection between the projections 82 and the slots 84. It will be furthermore observed, that the tubular member 78 forming part of the vertical pivot assembly and the part of the lost motion connection will also provide a protective enclosure for the universal joint connection 56 and will enable the pin and bolt assemblies 74 to be axially aligned therewith.

The arrangement of the present invention therefore, enables the use of a conventional differential for the front wheel drive mounted in a rugged manner and yet with a minimum number of parts and also requiring minimum assembly effort.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a vehicle having a transfer gear case and a propeller shaft extending therethrough for drive connection to a front wheel axle through a differential drive means including a housing and a drive shaft, the combination comprising said drive shaft universally connected to the propeller shaft, and means pivotally supporting said differential drive means about a vertical axis spaced from the front wheel axle, said pivotal supporting means comprising tubular means fixedly mounted on said transfer gear case and said front differential housing through which said shafts extend, vertical pivot means, said vertical pivot means including a tubular connecting member axially aligned with said tubular means mounted on the transfer gear case and pivotally secured at one end thereto, a lost motion connecting means operatively connecting the opposite end of said tubular member to the tubular means on the differential housing for accommodating limited angular displacement of the front wheel axle relative to the pivot means about a horizontal axis perpendicular to said vertical axis, said lost-motion connecting means consisting of at least one slot in the tubular connecting member, and at least one projection on the tubular means on the differential housing, said projection being received in said slot.

2. In a vehicle, a frame, a front wheel assembly, means pivotally securing said front wheel assembly to the frame, said means comprising longitudinally disposed aligned cylindrical means fixedly mounted on said frame and said front wheel assembly, a tubular member receiving one of said cylindrical means within one end thereof, the second end of said tubular member being pivotally secured to the other of said cylindrical means about a vertical axis, said tubular member having a plurality of slots therein adjacent said one end, said one of said cylindrical means having a plurality of projections thereon loosely received in said slots, said slots and projections forming a lost-motion connecting means for accommodating limited angular displacement of the front wheel assembly about a longitudinally disposed horizontal axis perpendicular to said vertical axis.

3. In a vehicle having a transfer gear case and a propeller shaft extending therethrough for drive connection to a front wheel axle through a differential drive means including a housing and a drive shaft, the combination comprising said drive shaft universally connected to the propeller shaft, and means pivotally supporting said differential drive means about a vertical axis spaced from the front wheel axle, said pivotal supporting means comprising tubular means fixedly mounted on said transfer gear case and said front differential housing through which said shafts extend, a tubular connecting member surrounding the universal connection between the drive shaft and the propeller shaft, said tubular member telescopically receiving the end of the differential housing tubular means, said end being provided with projections thereon, the tubular member having slots therein, said slots loosely receiving said projections thereby providing a lost-motion connection, said gear case tubular means being provided with upper and lower extending supporting arms, and said tubular connecting member provided with upwardly and downwardly projecting bolts pivotally secured to said supporting arms for pivotal movement of said tubular member about a vertical axis.

References Cited in the file of this patent

UNITED STATES PATENTS

| | | |
|---|---|---|
| 1,278,650 | Hewitt | Sept. 10, 1918 |
| 1,416,329 | Blodgett | May 6, 1922 |
| 1,761,669 | Howard et al. | June 3, 1930 |
| 2,150,011 | Tinker | Mar. 7, 1939 |